June 18, 1968     J. G. SCHRECKENDGUST     3,389,265
COLORIMETER FOR MEASURING THE TRISTIMULUS COEFFICIENTS OF
COLOR IN A LATERALLY MOVING MATERIAL
Filed May 3, 1965     4 Sheets-Sheet 1

INVENTOR
JAY G. SCHRECKENDGUST

BY *[signature]*

AGENT

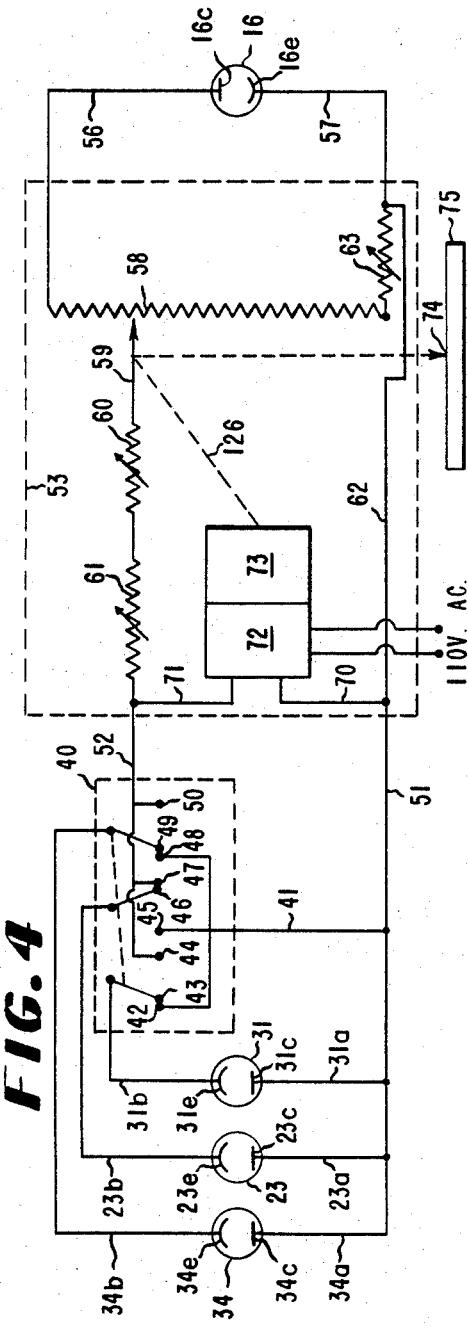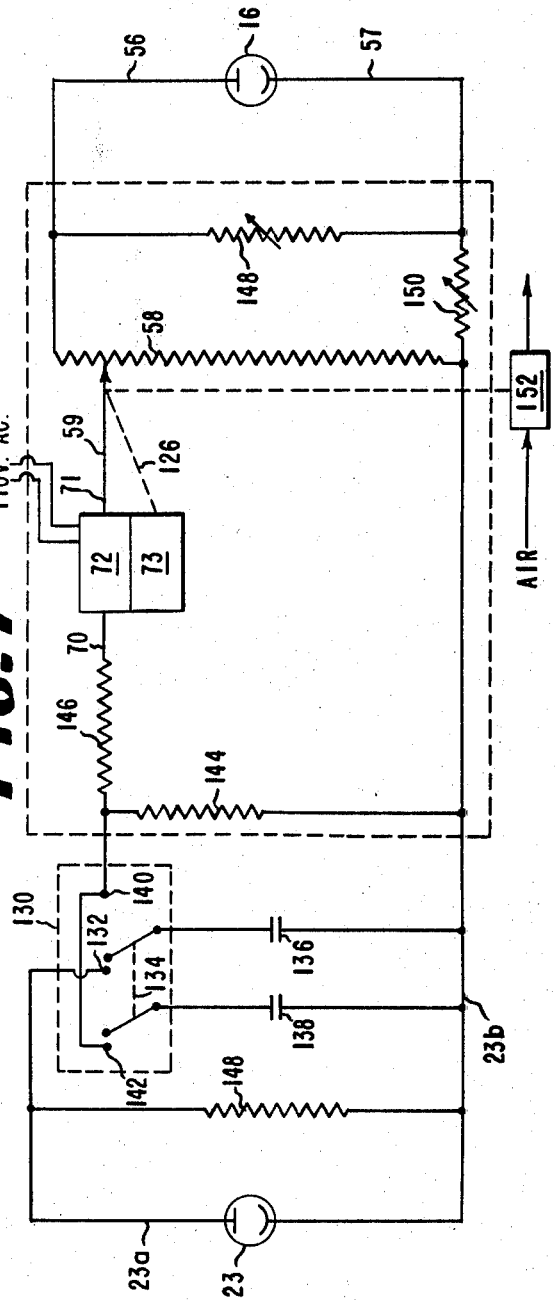

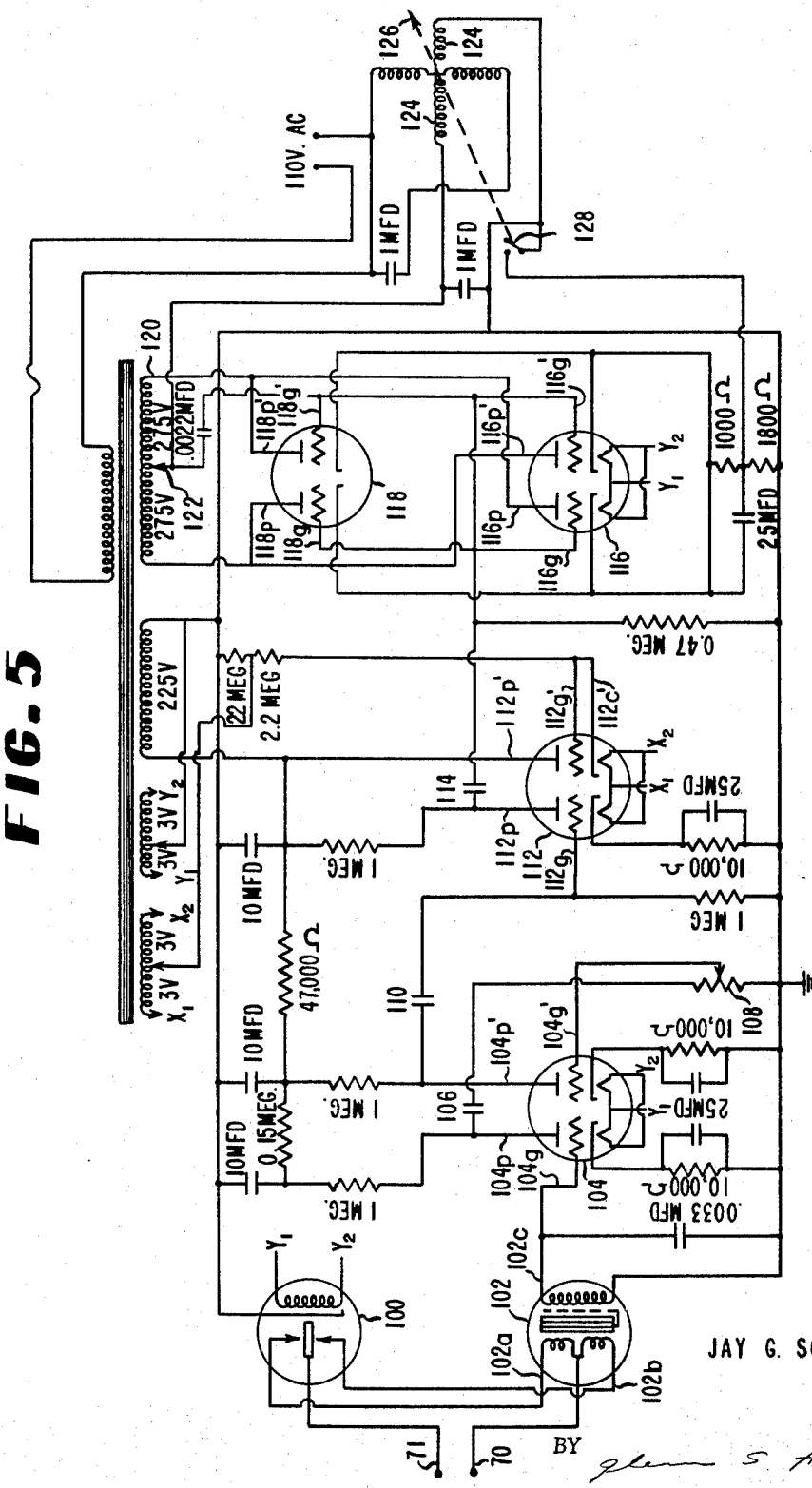

June 18, 1968  J. G. SCHRECKENDGUST  3,389,265
COLORIMETER FOR MEASURING THE TRISTIMULUS COEFFICIENTS OF
COLOR IN A LATERALLY MOVING MATERIAL
Filed May 3, 1965  4 Sheets-Sheet 4

INVENTOR
JAY G. SCHRECKENDGUST

BY
AGENT

United States Patent Office 3,389,265
Patented June 18, 1968

3,389,265
COLORIMETER FOR MEASURING THE TRISTIMULUS COEFFICIENTS OF COLOR IN A LATERALLY MOVING MATERIAL
Jay G. Schreckendgust, Cornwall, N.Y., assignor to E. I. du Pont de Nemours and Company, Wilmington, Del., a corporation of Delaware
Filed May 3, 1965, Ser. No. 452,565
7 Claims. (Cl. 250—226)

This invention concerns colorimeters which are particularly useful for accurately measuring tristimulus coefficients of the color of a laterally moving material. These colorimeters can also be used to compare and record numerical values describing properties of a color and to control processes in which a sheet material is embossed or color coated.

A human observes both the quantity and quality of a color. The humanly observed quantity of a color is its intensity or brightness. The humanly observed quality or chromaticity of a color is composed of the two elements of hue and saturation. Hue identifies the color as a red, blue, etc., and is a measure of the dominant wavelength of the color in terms of its effect on the human observer. Saturation identifies the color as a light or dark red, etc., and is a measure of the proportion of white light mixed with color of that hue. Human observers are more sensitive to wavelengths in the middle of the visible spectrum than wavelengths approaching the ultraviolet and infrared portions. Thus, the actual quantity of light of a certain wavelength emitted by a material must be modified in accordance with a human sensitivity curve to produce that light in terms of its effect on a human observer.

Color can be specified by assigning numerical values to the quantity of each wavelength of light in that color. However, these numerical values are cumbersome and not readily useful because values representing the humanly observed properties of colors are obtainable from them only by extensive calculation. As a result of establishment by the International Committee on Illumination (ICI) of three primary stimuli with which any color in the humanly visible spectrum can be matched, any humanly visible color can be specified in terms of the quantities of these stimuli. FIGURE 1 of the drawings is a plot of the ICI primary stimuli. Each of these primary stimuli is an assembly of specified proportions of light of certain wavelengths as shown in FIGURE 1 and represents the maximum of a family of curves. The X curve represents an essentially red stimulus, the Y curve an essentially green stimulus, and the Z curve an essentially blue stimulus.

Any color can be represented by a curve in each family. Ordinates of the maximums of the curve in each family are the tristimulus coefficients of the color. The Y curve was selected by ICI so the plot of proportion versus wavelength corresponds to the light sensitivity curve of the normal human eye; the ordinate of the Y curve of the color, corrected for the intensity of the illuminating source, identifies the intensity of the color. The hue and the saturation of the color can be readily calculated from its tristimulus coefficients by using the chromaticity diagram described by Margenau, Watson and Montgomery, Physics Principles and Applications, 673–677 (2nd Edition, McGraw-Hill Book Co., New York, 1953).

Apparatus of the prior art capable of measuring tristimulus coefficients of a color ordinarily comprised a light source and three appropriately filtered detector photoelectric cells. Electrical output of these photocells was calibrated with standards so that stimuli values were obtained directly. This apparatus was sensitive to the location of the material from the light source and the photocells and was not accurate when used to determine color characteristics of laterally moving materials which do not remain in a constant location. Variations in the voltage supplied to the light source of this apparatus introduced additional errors into the measurements and decreasing efficiency of the light source which used necessitated frequent recalibration of this apparatus. Specular and spurious light which reached the photoelectric cells when measuring color characteristics of moving material also resulted in inaccuracies with color measuring apparatus known in the prior art.

This invention provides a colorimeter for accurately measuring the properties of light diffused from a laterally moving material. This colorimeter comprises (A) a light source for directing a collimated beam of light, consisting essentially of wavelengths up to about 7000 Angstrom units, against the surface of said material,
(B) a photocell monitoring said light source,
(C) receptor means for receiving a portion of the light of said beam diffused from said material, said receptor means comprising
  (1) an elongated tube open at one end, said tube disposed to receive said portion of light at said open end and transmit the diffused light to the closed end, said tube having baffles disposed therein for inhibiting spurious light from reaching said closed end,
  (2) at least one detector photocell disposed within said closed end in the path of said diffused light, and
  (3) filter means within said tube for controlling the wavelength distribution of diffused light reaching said photocell,
(D) electrical means connecting the output of said detector photocell with one side of the input of an electrical amplifier,
(E) resistance means electrically connecting the output of said monitoring photocell with the other side of the input to said amplifier, and
(F) means for indicating the output of said amplifier.

FIGURE 2 of the drawings is a side view of a colorimeter of this invention including sectional views of the light source and the receptor tube.

FIGURE 4 is a schematic diagram showing electrical connection of the photocells to the amplifier.

FIGURE 5 is a schematic diagram of the amplifier circuitry and includes the circuitry of a servo motor slide-wire drive system for use with a chart recorder.

FIGURE 7 is a schematic diagram showing electrical connection of the photocells to the amplifier which comprises means for storing detector photocell output.

Colorimeters of this invention are most effectively used to measure diffuse reflectance of moving textiles and sheet materials, including poromeric materials. Intensity of the diffuse reflectance from sheet materials is related to smoothness of the surface. Surface smoothness of poromeric materials depends to some extent on porosity. Colorimeters of this invention having only one detector photocell are useful in determining this surface smoothness and in analyzing effects of processes such as embossing on surface smoothness.

Figure 2:
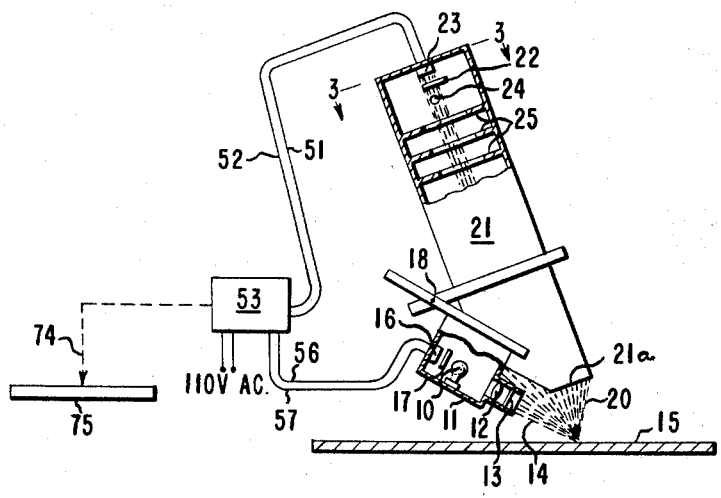

In FIGURE 2, an electric lamp 10 having a tungsten filament is mounted in a box 11 so that light produced by the lamp passes through a collimating lens 12 and an infrared filter 13. A collimated beam of light 15 essentially free of infrared wavelengths results. This beam is directed at the material 15 being examined. A photocell 16 is mounted in box 11 to monitor electric lamp 10. The purpose of this photocell is to automatically compensate for changes in line voltage and lamp efficiency including the temporarily decrease lamp efficiency during most of the lamp warmup time. Using this photocell, colorimeters of this invention are capable of achieving calibration readiness within 30 seconds from the time power is applied which is about 1/100 of the time required for some presently commercial colorimeters. An infrared filter 17 can be used if desired to decrease heating effects of lamp 10 on monitoring photocell 16 which further improves accuracy of the colorimeter during the warmup period. Additional insulation of this photocell from heat can be attained by mounting the monitoring photocell in an insulating jacket or separate box.

Some of the diffused light 20 resulting from scattering of beam 14 by material 15 enters the open end 21a of receptor tube 21 and is transmitted through filter 22 to detector photocell 23. A threaded member 24 is mounted in the wall of receptor tube 21 to mechanically adjust the quantity of diffused light reaching the detector photocell. A series of baffles 25 is mounted in the receptor tube 21 to prevent spurious light from reaching photocell 23. The energy of the light striking the detector photocell is converted to an electrical voltage which appears on collector 23c shown in FIGURE 4.

Figure 3:
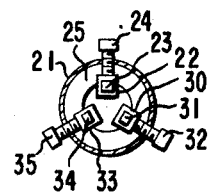
FIGURE 3 is a top sectional view of the receptor tube taken along line 3—3 in FIGURE 2.

FIGURE 3 shows a top view of a preferred detector photocell arrangement comprising three detector photocell-filter combinations in which 30 and 33 designate the two additional filters and 31 and 34 designate the two additional detector photoelectric cells. Additional threaded members 32 and 35 can be included if desired to allow individual adjustment of the quantity of light reaching each detector photocell. Including means for individually adjusting the quantity or light reaching each photocell in the tube increases both versatility and accuracy of colorimeters of this invention and also increases the life of the detector photocells.

Spectral distribution of the light reaching each detector photocell primarily depends on spectral distribution of beam 14, color of the material 15 and transmission characteristics of the filter 22, 30, or 33 associated with each detector photocell. An electric lamp having a tungsten filament is a preferred light source in this invention because light resulting therefrom has a predictable wavelength distribution throughout the humanly visible spectrum. Movie projector lamps of about 300 watts are readily available and are especially useful in examining poromeric materials using this invention. Colorimeters of this invention can be readily adapted to use light sources producing light having a variety of spectral distributions by adjusting threaded members 24, 32, and 35 and by substituting filters having different transmission characteristics.

Figure 1:
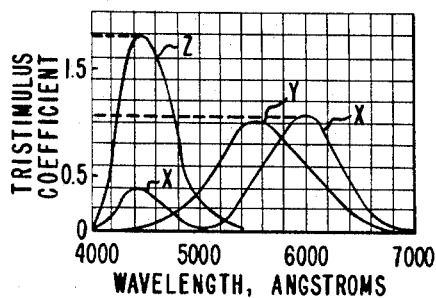

Filters 22, 30, and 33 are selected so that one detector photocell responds to a wavelength distribution in the family of the 5000 to 7000 Angstrom portion of the X curve (red tristimulus) of the ICI primary stimuli in FIGURE 1 and the second and third detector photocells respond to a wavelentgh distribution in the families of the Y and Z curves respectively. For most purposes the 5000 to 7000 Angstrom portion of the red tristimulus adequately identifies the red tristimulus response. If desired, the full red tristimulus curve can be calculated by including an attenuated portion of the blue (Z) curve. Commercially available photocells generally vary slightly in their response to light of different wavelengths. Response curves are published by the photocell manufacturer. Colorimeters of this invention having the closest conformance to human observers result when the response curve of the detector photocell is considered in selecting the filter for that photocell. Each filter is a sandwich of several filter materials of varying thicknesses selected from manufacturer's specifications to give the best conformance to the desired photocell-filter response curve for the light source. Filter materials are readily obtainable from the Corning Glass Co., Corning, N.Y.

Collimating lens 12 in a colorimeter of this invention particularly useful with poromeric materials has a focal length of about 1.5 inches and a diameter of about 1.75 inches. This lens produces a beam containing a relatively high proportion of the total light emitted by the lamp. The lens can be masked to produce a beam having a certain size or aspect ratio if desired. Use of a high efficiency light producing system comprising this collimating lens and a 300 watt projection lamp results in a colorimeter of this invention having increased sensitivity and decreased susceptibility to errors caused by spurious background light, thereby allowing the use of the colorimeter in rooms having ordinary lighting.

Color measurements on low gloss materials such as poromeric materials with colorimeters of this invention are most accurate when the beam of light 14 strikes the material 15 at an angle of about 40° to 50° from the perpendicular and the longitudinal axis of receptor tube 21 is at an angle of about 20° to 25° from the beam toward the perpendicular. With this arrangement, errors caused by including specular light are essentially eliminated.

When the colorimeter of this invention is mounted with light source 10 about 6 inches and photocells 23, 31, and 34 about 26 inches from material 15, sensitivity to changes in material location (caused by flapping) or attitude (caused by wrinkling) is well within acceptable limits for most production operations. For example, a change in the distance from the photocells to material of ±0.025 inch or a change in the angular orientation of the illuminated area on the material of ±1.5° varies the quantity of light received by the detector photocell in this arrangement by only about 0.2%. The box 11 containing the light source is pivotally mounted to the receptor tube at pin 18 to allow adjustment of the distance of the colorimeter from the material. Depending on the accuracy desired, colorimeters of this invention having longer or shorter distances between light source or detector photocells and material can be made.

Open end 21a of receptor tube 21 is generally positioned about 4 inches from material 15. A receptor tube having a length of at least about 22 inches, a diameter of about 4 inches, and containing about 18 evenly spaced circular baffles 25 having an inner opening about 2.8 inches in diameter allows practically no spurious light to reach the photocells.

Figure 6:
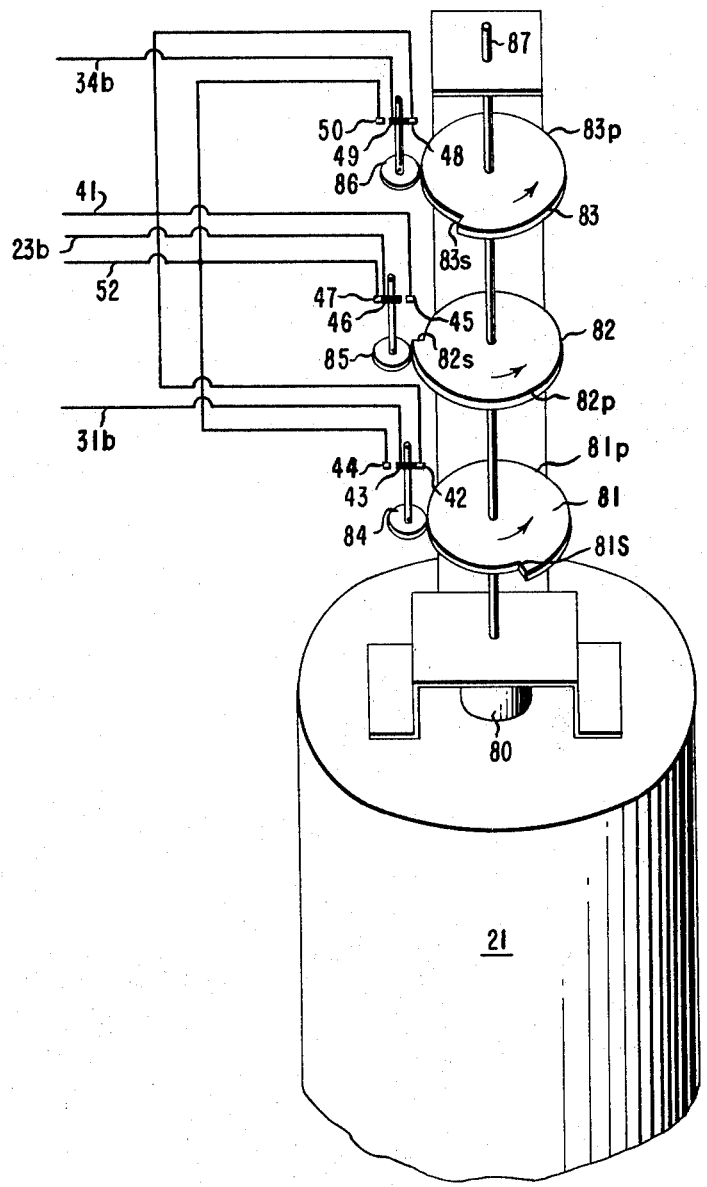
FIGURE 6 is a motor driven gang switch useful in colorimeters of this invention which have more than one detector photocell.

FIGURE 4 shows the circuitry for individually utilizing the output of each detector photocell of colorimeters containing three detector photocells. The gang switch represented in FIGURE 4 by dotted line 40 is adapted to switch each photocell individually into the circuit while simultaneously shunting the other two photocells through lead 41 to eliminate the effects of spurious output of photocells not presently in the circuit and to increase the life of the photocells. Motor driven cam operated gang switches can be conveniently mounted on top of receptor tube 21 and are particularly useful in colorimeters of this invention. A typical gang switch of this type is shown in FIGURE 6 and is described below. Operation of the amplifier input circuit shown in FIGURE 5 is described herein as though contacts 46–47 in the gang switch are closed to put photocell 23 into the circuit and contacts 42–43 and 48–49 are closed to shunt photocells 31 and 34 respectfully.

In the schematic of FIGURE 4, voltage developed by detector photocell 23 is carried from collector 23c via leads 23a, 51 and 70 to amplifier 72 (within box 53 which is also shown in FIGURE 2). The detector photocell circuit is completed through leads 71, 52 and 23b to photocell emitter 23e.

Voltage developed by monitoring photocell 16 is carried from collector 16c via lead 56 to within box 53 where this compensating voltage is divided by slidewire resistor 58, one portion passing through slidewire tap 59 and variable attenuating resistors 60 and 61 to the other side 71 of the input to amplifier 72 and the other portion passing through the remainder of resistor 58, zero suppression resistor 63 and lead 57 to emitter 16e. The monitoring photocell circuit which includes amplifier 72 is completed through leads 70, 62, and lead 57 to emitter 16e. Note that the attenuated voltage developed by the monitoring photocell is opposed to the detector photocell voltage at the amplifier input so the amplifier responds to the difference between these voltages.

Slidewire resistor 58 is usually about 100 ohms and has a linearity of ±0.1%. Zero suppression resistor 63 is continuously variable from 0 to about 200 ohms. Attenuating resistor 60 can be varied from 0 to 10,000 ohms in 1000 ohm increments and attenuating resistor 61 can be varied from 0 to 100,000 ohms in 10,000 ohm increments. The purpose of these attenuating resistors is to expand the scale of slidewire resistor 58 and additional attenuating resistance can be added if desired. Zero suppression resistor 63 is used to shift the reading point of tap 59 on resistor 58 upward or downward as desired without affecting the breadth of the slidewire scale.

Amplifier 72 amplifies the voltage differential existing across input leads 70 and 71 to drive a servo motor 73. The armature 126 of servomotor 73 is mechanically connected to tap 59 and automatically repositions the slidewire until the voltage at lead 71 equals the voltage at lead 70. Also mechanically attached to armature 126 is pen 74 which records the position of the tap 59 on this slidewire on moving chart 75. A useful servo system comprising an amplifier, servomotor, slidewire, pen and chart is manufactured by the Brown Instrument Division of Minneapolis-Honeywell Reg. Co. as Model 15 Electronik.

A circuit diagram of a typical amplifier is shown in FIGURE 5. Referring to this figure, the D.C. voltage differential across leads 70 and 71 is converted by synchronous converter 100 to an approximately square wave signal having a frequency of 60 cycles per second. The resulting signal is alternately positive at opposite sides 102a and 102b of transformer 102. Transformer secondary output 102c is applied to grid 104g of the first half of a 12AX7 twin triode amplifier tube 104. An amplified square wave appears at plate 104p of tube 104 and is coupled through capacitor 106 to variable resistor 108. Resistor 108 is continuously variable from 0 to $10^6$ ohms and serves as a gain control. Voltage passing through the sliding contact of resistor 108 is applied to grid 104g' of the second half of tube 104 to produce an amplified voltage on plate 104p'.

This amplified voltage from plate 104p' is coupled through capacitor 110 to grid 112g of the first half of another 12AX7 twin triode amplifier tube 112. Amplified voltage is produced on plate 112p and is coupled through capacitor 114 to each grid 116g, 116g', 118g, and 118g' of two 12AU7 twin triode amplifier tubes 116 and 118. Capacitors 106, 110 and 114 are about 0.05 microfarad each.

Plates 116p and 118p' are connected to one side and plates 116p' and 118p are connected to the other side of a secondary winding 120 so that 60 cycle alternating current is supplied to each set of plates. Amplified voltage is produced on plates 116p and 118p' only when positive polarity of the signal produced by synchronous converter 100 and appearing in amplified form on grids 116g, 116g', 118g and 118g' coincides with positive polarity of the voltage on these plates. In the same manner, amplified voltage is produced on plates 116p' and 118p only when positive polarity of the signal produced by converter 100 coincides with positive polarity of the voltage on these plates. Phasing of the signal produced by converter 100 depends on whether lead 71 is positive or negative compared to lead 70.

Amplified voltage appearing on either plates 116p and 118p' or 116p' and 118p passes through lead 122 to the directional drive windings 124 of a phase reversible servomotor. Armature 126 of this servomotor is connected to slidewire tap 59 so that tap 59 is moved to equalize the voltage at input leads 70 and 71. End stop 128 is provided to stop the servomotor at either end of slidewire resistor 58. The second half of tube 112 (cathode 112c', grid 112g' and plate 112p') is used as a rectifier to produce DC plate voltage for tube 104 and the amplifying half of tube 112. If desired, amplifier output can be indicated on the dial of an ordinary voltmeter.

In colorimeters of this invention having three detector photocells, a motor driven gang switch can be used to sequentially connect and disconnect each photocell with the amplifier input so the output of each photocell is sequentially recorded on chart 75 by a single pen 74. In FIGURE 6 which shows a gang switch for use in a colorimeter having three detector photocells, synchronous motor 80 drives shaft 87 and attached cams 81, 82 and 83 in the direction shown at a speed selected to provide a certain number of cycles per minute. The circumference of each cam contains a step 81s, 82s and 83s. Behind each step the radius of each cam increases to the maximum radius at points 81p, 82p and 83p two-thirds of the distance along the circumference to the top of the step. Location of points 81p, 82p and 83p determines the dwell time of the switch actuated by each cam. Riding on the circumference of each cam 81, 82 and 83 are follower assemblies 84, 85 and 86, respectively.

Electrical contacts 43, 46 and 49 are attached to followers 84, 85 and 86, respectively. Adjacent to contact 43 are contacts 42 and 44 disposed so that contact 43 is electrically connected to contact 42 while follower 84 is on the sector of increasing radius of cam 81 between step 81s and point 81p and is electrically connected to contact 44 when follower 84 is on the sector of constant radius of cam 81 between point 81p and step 81s. Contacts 45 and 47 are similarly located with respect to contact 46 and contacts 48 and 50 are similarly located with respect to contact 49. Cams 81, 82 and 83 are fixedly mounted on motor shaft 87 so that the steps of the cams are equidistantly located around the shaft. Motor speeds of 5 r.p.m. produce a reading time of 4 seconds for each of three detector photocells. Stopping motor 80 at a point at which the cams hold one detector photocell in the amplifier circuit and shunts the other detector photocells allows a colorimeter containing this gang switch to read the output of one photocell continuously.

A colorimeter which sequentially reads the output of two detector photocells can be produced with a gang switch having two cams. By locating points p 180° from the step of each cam and positioning the step of one cam adjacent to point p of the other cam, output of each photocell in this two photocell system reaches the amplifier one half of the time. Unequal photocell time sharing can be achieved with a set of cams having point p at a location different for each cam. Colorimeters of this invention containing two detector photocells are useful for producing color data of materials in which the third component is of no interest or in which the color of interest is a combination of only two tristimulus colors.

Outputs of two detector photocells of colorimeters of this invention can be electrically combined to produce a resultant output which is the sum or difference of the individual photocell outputs. A gang switch having 2 cams can be used to sequentially connect this resultant voltage and the voltage from the third photocell to an amplifier. If desired, multiple pen recorders can be used in colorimeters of this invention to continuously record the output of multiple detector photocells. Each pen of a multiple pen recorder requires its own amplifier and servomotor.

Colorimeters of this invention can be calibrated to produce tristimulus coefficients directly or they can be used to measure color differences between a standard and a material. When used to measure differences, standardization of the colorimeter is accomplished by obtaining tristimulus coefficients of the color standard. For maximum sensitivity a standard having color characteristics as close as possible to the material is used. When the colorimeter is used for quality control of a production operation, standards preferably have the color characteristics of the desired product. Tristimulus coefficients of the material under consideration can then be directly compared with the standards by colorimeters of this invention. Once coefficients of a color standard have been recorded, the colorimeter can be recalibrated to that standard by setting resistors 58, 60, 61 and 63 to the values at which coefficients of the standard were initially obtained and adjusting threaded members 24, 32 and 35 until the original readings of the instrument are obtained.

Variations usually occur in the color characteristics of colored sheet materials, especially when large rolls of materials are color coated in essentially continuous processes. Colorimeters of this invention can be used to accurately control color coating of sheet materials by reading the starting color characteristics of the material and automatically adjusting application equipment to compensate for variations. A time delay is necessary in these colorimeters to allow the portion of material observed by the colorimeter to move under the application equipment. FIGURE 7 schematically shows a useful amplifier input circuit comprising capacitors for temporarily storing detector photocell output.

In FIGURE 7, output developed by detector photocell 23 is carried by lead 23a to contact 132 of switch 130 shown in FIGURE 7 by the box formed by dotted line 130. With throw 134 in the position shown in FIGURE 7, this output is carried to capacitor 136. After a predetermined time delay period, usually about 4 to 8 seconds, throw 134 indexes to connect capacitor 136 with contact 140 thereby applying the charge on this capacitor across resistor 144 and at the same time connects capacitor 138 with contact 132 to receive the detector photocell output. Voltage developed by the capacitor charge at the top of resistor 144 is applied through isolation resistor 146 to input lead 70 of amplifier 72. Similarly the charge on capacitor 138 is applied through contact 142 across resistor 144 when throw 134 again indexes.

Capacitors 136 and 138 are 180 microfarads at 10 volts. Tantalum capacitors having a solid electrolyte are particularly useful for storage because of excellent accuracy under conditions including mechanical shock. These tantalum capacitors are obtainable from Sprague Electric Corp. Resistor 144 is about 100,000 ohms to provide a high impedance capacitor output circuit thereby preventing substantial discharge of the capacitor and producing steady voltage across resistor 144 during the readout period. Isolation resistor 146 is about 50,000 ohms. A discharge resistor 148 across leads 23a and 23b of about 1000 ohms is provided to allow sufficient discharge of the capacitors when the output of photocell 23 is reduced. This high impedance capacitor output circuit with a discharge resistor in the capacitor input circuit reduces capacitor charging time and increases accuracy.

Voltage developed by monitoring photocell 16 is carried via lead 56 and tap 59 of slidewire resistor 58 to amplifier input 71. Resistor 148 is continuously variable from 0 to about 100 ohms and provides gain adjustment. Resistor 150 is continuously variable from 0 to about 50 ohms and provides zero suppression.

Amplifier 72 and servomotor 73 function as described above. Armature 126 is connected to both tap 59 and a valve 152 which effects the desired change in the application equipment, for example, by increasing or decreasing the air pressure in a color spraying operation.

Because the monitoring photocell in the circuit of FIGURE 7 compensates only for relatively continuous variations in the light source such as changes in lamp efficiency and not for line voltage variations taking place during the delay period, a voltage regulator is included in the power supply line to lamp 10 for best accuracy.

The circuit shown in FIGURE 7 controls application equipment in response to average color characteristics of the length of material passing under the colorimeter during the time delay period. Continuous response can be provided by using a magnetic tape delay system; however, most color spraying equipment is incapable of applying color coatings to a sufficiently narrow length to warrant the expense of a continuous system. The averaging time period can be made shorter than the time delay period by increasing the number of storage capacitors. Acceptable production control of a spray process applying a color coating to moving sheet material can be attained with the circuitry of FIGURE 7 by averaging color characteristics over lengths of about 0.1 yard.

Abrupt changes in color application caused by differences between the charges on the capacitors can be minimized if desired by allowing throw 134 of switch 130 to momentarily connect capacitor 138 to contact 142 before disconnecting capacitor 136 from contact 140. Voltage appearing at input lead 70 is then momentarily the average of the voltage on the capacitors. An overlap of about 1 to 10 milliseconds is usually sufficient but a longer overlap might be desirable for large differences. Readily available switches useful for this application can be of the rotating knifeblade type or rotating cam type shown in FIGURE 6.

What is claimed is:
1. A colorimeter for measuring the color characteristics of light diffused from a material which comprises
    (A) a light source for directing a collimated beam of light, consisting essentially of wavelengths up to about 7000 Angstrom units, against the surface of said material,
    (B) a photocell monitoring said light source,
    (C) receptor means for receiving a portion of the light of said beam diffused from the material, said receptor means comprising
        (1) an elongated tube open at one end, said tube disposed to receive said portion of light at said open end and transmit the diffused light to the closed end, said tube having baffles disposed therein for inhibiting spurious light from reaching said closed end,
        (2) at least one detector photocell disposed within said closed end in the path of said diffused light, and
        (3) filter means within said tube for controlling the wavelength distribution of diffused light reaching said photocell,
    (D) electrical means connecting the output of said detector photocell with one side of the input of an electrical amplifier,
    (E) resistance means electrically connecting the output of said monitoring photocell with the other side of the input to said amplifier, and
    (F) means for indicating the output of said amplifier.
2. The colorimeter of claim 1 in which said receptor tube has two detector photocells disposed within its closed end to receive said diffused light and filter means within said tube associated with each photocell for controlling the wavelength distribution of light reaching each photocell, said colorimeter having means for sequentially connecting and disconnecting each detector photocell with said amplifier.
3. The colorimeter of claim 2 in which said tube contains means for individually controlling the quantity of light reaching each photocell.
4. The colorimeter of claim 3 in which said receptor tube has three detector photocells disposed therein, filter means associated with one photocell to render this photocell sensitive to light having the green tristimulus distribution, filter means associated with the second photocell to render this photocell sensitive to light having the 5000 to 7000 Angstrom portion of red tristimulus distribution and filter means associated with the third photocell to render this photocell sensitive to light having the blue tristimulus distribution, said colorimeter having means for sequentially connecting and disconnecting each detector photocell with said amplifier.

5. The colorimeter of claim 4 in which the indicating means comprises a servomotor actuated by the output of the amplifier, said servomotor driving the slidewire of a slidewire resistor located in the means electrically connecting the output of the monitoring photocell with the input to the amplifier to automatically balance the amplifier input voltages, and means for determining the position of said slidewire.

6. The colorimeter of claim 1 in which the means electrically connecting the output of the detector photocell with one side of the input to the amplifier comprises capacitors for storing said output.

7. The colorimeter of claim 6 in which the circuit connecting the detector photocell with the storage capacitors comprises a discharge circuit for said capacitors, and the circuit connecting the storage capacitors with said amplifier is of high impedance.

References Cited

UNITED STATES PATENTS

| | | | |
|---|---|---|---|
| 3,160,759 | 12/1964 | Ward | 250—216 |
| 3,200,404 | 8/1965 | Ott | 346—34 |
| 3,330,960 | 7/1967 | Rich | 250—226 |

JAMES W. LAWRENCE, *Primary Examiner.*

W. J. SCHWARTZ, *Assistant Examiner.*